March 2, 1948.     P. A. JASMER     2,437,031

TIRE CHAIN

Filed May 28, 1945

INVENTOR
PEARLEY A. JASMER
BY
Gerald P. Welch
ATTORNEY

Patented Mar. 2, 1948

2,437,031

UNITED STATES PATENT OFFICE 2,437,031

TIRE CHAIN

Pearley A. Jasmer, Milwaukee, Wis.

Application May 28, 1945, Serial No. 596,291

1 Claim. (Cl. 152—228)

This invention relates to improvements in tire chains, and more particularly to a novel anti-skid chain of the inverted channel type.

An object of the invention is to provide a device of the type which will more effectively minimize or prevent skidding in a lateral direction as well as longitudinally with reference to the travel movement of a vehicle. Devices of the type now in use are believed to be more efficacious to the limit of their effectiveness in operation against longitudinal skidding.

Another object of the invention is to provide a cross-link tire chain element which will have relatively greater strength than is possible in devices of the type heretofore evolved.

Another object of the invention is to provide a device of the character described having a cross-link element which will maintain a more positive engagement with the road surface than is possible with the conventional cross-link now in use.

Other and further objects of the invention will appear as the description proceeds, reference being had to the accompanying drawing, in which.

Figure 1:
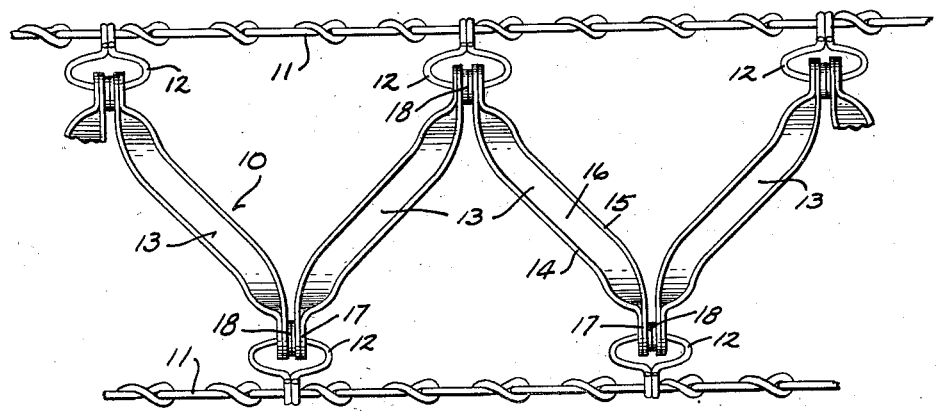
Fig. 1 is a plan view of a portion of a tire chain embodying my invention, applied to a tire.
Figure 2:
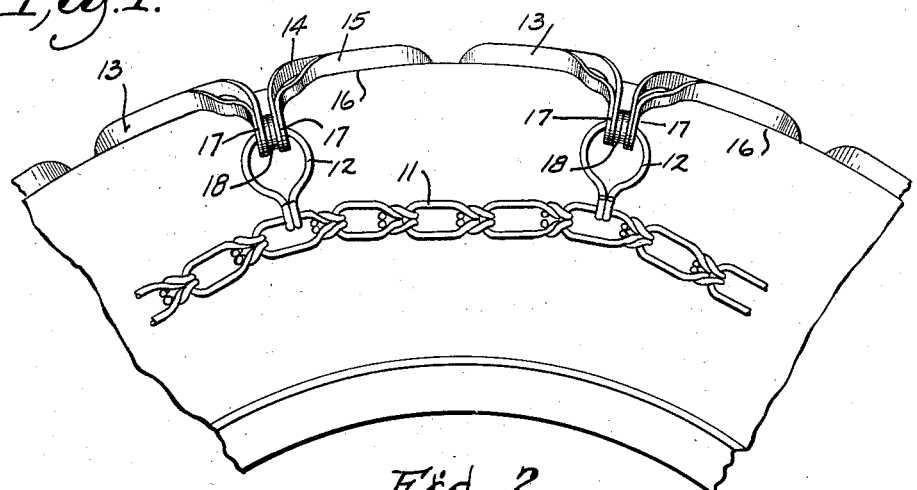
Fig. 2 is a side view of the portion of the chain applied to an automobile tire.
Figure 3:
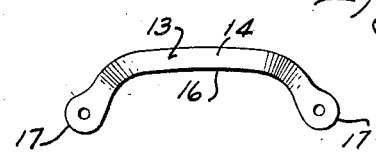
Fig. 3 is a side view of one of the serpentine channeled cross links.

Referring more particularly to the drawings, the numeral 10 refers to the device generally having a pair of endless side chains 11 of conventional structure. Spaced alternately and inwardly disposed on the side chains 11 are the loop link elements 12 which secure the paired ends of the cross-links 13 in flexible engagement with the said side chains 11.

The cross-links 13 are of channel form with the channel edges 14 and 15 disposed outwardly to engage the road surface, and the tire contacting side 16 of the cross-link 13 is flattened to obviate any damage to the tire surface. Each link 13 has an eye 17 at each end thereof to receive the loop link 12, and each eye is outwardly flanged as at 18 to space the ends of said cross-links 13.

Each cross-link 13 has a serpentine formation to provide a parallel relation of the paired ends of the assembled cross-links in the chain 10.

It will be understood that the device is capable of many modifications in structure and design, without departing from the spirit of the invention, within the scope of the appended claim.

Having thus described my invention, I claim:

In a device of the character described, a cross-link having a channel formation and eyes one in each end thereof, an angular planar bend of the link adjacent one end thereof, and a planar oppositely directed bend adjacent the other end thereof both bent portions being inclined rearwardly of said channel to conform to a tire curvature.

PEARLEY A. JASMER.

REFERENCES CITED

The following references are of record in the file of this patent:

UNITED STATES PATENTS

| Number | Name | Date |
|---|---|---|
| 1,329,483 | Waite | Feb. 3, 1920 |
| 1,343,293 | Waite | June 15, 1920 |
| 1,961,549 | Calhoun | June 5, 1934 |
| 2,066,368 | Snyder | Jan. 5, 1937 |
| 2,317,311 | Stough | Apr. 20, 1943 |